United States Patent [19]

Hardin

[11] Patent Number: 5,042,132

[45] Date of Patent: Aug. 27, 1991

[54] HYDRAULIC CAM BUSHING INSTALLATION AND REMOVAL TOOL

[75] Inventor: Richard A. Hardin, Columbus, Ind.

[73] Assignee: Cummins Engine Company, Inc., Columbus, Ind.

[21] Appl. No.: 463,341

[22] Filed: Jan. 10, 1990

[51] Int. Cl.[5] .............................................. B23P 19/04

[52] U.S. Cl. ...................................................... 29/252

[58] Field of Search ................. 29/252, 275, 280, 263, 29/271, 213 R, 720

[56] References Cited

U.S. PATENT DOCUMENTS

| | | | |
|---|---|---|---|
| 2,617,181 | 11/1952 | D'Halm | 29/252 |
| 2,751,670 | 6/1956 | Grad . | |
| 3,268,995 | 8/1966 | Pullin | 29/275 |
| 3,327,337 | 6/1967 | Nelson . | |
| 4,477,956 | 10/1984 | Mefford | 29/252 |
| 4,619,027 | 10/1986 | Ohannesian . | |
| 4,841,627 | 6/1989 | Arnold et al. | 29/252 |
| 4,899,899 | 1/1990 | Hamatani | 29/252 |

*Primary Examiner*—Robert C. Watson

*Attorney, Agent, or Firm*—Sixbey, Friedman, Leedom & Ferguson, P.C.

[57] ABSTRACT

A simple, hydraulically powered tool for removing and installing the camshaft bushings of an internal combustion engine including an elongated shaft adapted to extend through the camshaft bearing journals to a hydraulic unit which is adapted to be reversibly mounted at one end of the engine to apply either a pushing or pulling force to the shaft. The elongated shaft includes a plurality of axially spaced annular grooves which are adapted to receive a first slotted collar at one end for interconnecting the shaft to the piston of the hydraulic unit and a second slotted collar at the other end to interconnect the shaft to a slotted bushing support mandrel which is adapted to be slid onto the shaft for engagement with a bushing to be installed or removed. A spacer is provided for mounting the hydraulic cylinder unit on the engine when the cylinder unit is operated to impart a pulling force to the shaft and a cradle is provided for mounting the hydraulic cylinder unit when a pushing force is to be imparted to the shaft.

23 Claims, 8 Drawing Sheets

HYDRAULIC CAM BUSHING INSTALLATION AND REMOVAL TOOL

TECHNICAL FIELD

This invention relates to a tool for installing and removing bushings located in a plurality of axially aligned journals in an internal combustion engine. More particularly, the invention relates to a simple, hydraulically powered camshaft bushing installing and removing tool which is adapted for in-the-field servicing of internal combustion engines.

BACKGROUND ART

Most internal combustion engines include intake and exhaust valves operated by cams located along a camshaft mounted generally along the length of the engine. Normally, the crankshaft is supported by a series of bearings resting in corresponding engine journals spaced axially along the length of the shaft. Each bearing is supported in its corresponding journal by a bushing which is replaceable should it become worn or damaged. Further, the bushing is normally located within the journal to align a butt joint seam or passage with a lubricating passage to allow lubrication fluid to pass from the engine to the bearing surface of the bushing. If the bearing becomes worn or damaged for any reason, such as a lubrication system failure, the bushings must be replaced.

In the past only primitive methods for installing and removing camshaft bushings were generally available. Initially, a hammer and chisel were used to remove old bushings while a hammer and mating block were used for installing new ones. This method proved to be unsatisfactory for servicing bushings due to the difficulty of reaching engine journals located deep within the engine. Further, the use of a hammer and block was not an extremely accurate way to insert a bushing and could result in damage to the bushing and/or engine block.

To overcome the problems associated with the use of these simple tools, more complex devices have been developed for removing and installing camshaft bushings U.S. Pat. No. 3,327,337 issued to German discloses a size adjustable tool for removing and installing cam shaft bushings including a puller rod on which a mandrel is slidable upon the rod to insert or remove a bushing from a bushing journal. Bushings are installed or removed by pulling the rod in the proper direction to accomplish the desired function. Moreover, the rod is pulled in a manual operation by a threaded portion at the end of the rod which is threadingly engaged with a nut and washer arrangement providing movement in one direction. However, due to the nature of differing engine bearing journals, it is sometimes beneficial to push some of the journal bushings into place while others are more desirably pulled. The same may be true for bushing removal. German does not allow such an operation using a single rod.

Attempts have been made to automate camshaft bushing removal and installation. U.S. Pat. No. 2,751,670 issued to Grad discloses a bushing assembly press which includes an hydraulic powered system for inserting a series of bushings into a plurality of journals all of which are in axial alignment. However, the system developed by Grad is a large, complicated system including several separate bushing rams mounted on a mechanism which rotates into alignment with the bushing bore to allow the hydraulic pushing means to insert each bushing into its appropriate journal Due to the large nature of this system, it is not appropriate for field servicing of bushings, nor does it provide a means of removing old bushings from their journals.

As stated above, it is also important when installing a camshaft bushing to properly align the oil supply opening in the wall of the bushing with the oil delivery passage of the engine block. U.S. Pat. No. 4,619,027 to Ohannesian discloses a tool for installing and aligning camshaft bushings including mandrels equipped with spring biased pins to align with the oil delivery system. The tool, however, requires manual hammering to install the bushing which may be hard to accurately control for journals located deep within the engine block. Also, the tool does not provide a means of removing old bushings.

Therefore, a simplified camshaft bushing removing and installing tool which is hydraulically powered would by beneficial to service technicians for use in the field. Particularly, desirable would be a tool which provides hydraulically powered motion in both a pushing and pulling mode for expedient camshaft bushing removal and installation.

SUMMARY OF THE INVENTION

Therefore, an object of the present invention is to overcome the deficiencies of the prior art and provide a tool for installing and removing a bushing at each of a plurality of axially aligned bushing journals in an internal combustion engine.

Another object of the present invention is to provide a tool for installing and removing bushings which is powered by a simple, hydraulic system ideally suited for field servicing of engines.

Still another object of the present invention is to provide a tool for installing and removing a bushing including a simple, hydraulic system operated directly by the user wherein the system can be readily adjusted by reversing the hydraulic system unit to provide motion in either a pulling or pushing mode of operation.

Yet another object of the present invention is to provide a tool for installing and removing a bushing including a simple, hydraulic system including a piston allowed to reciprocate within a cylinder as a function of hydraulic fluid pressure which pushes or pulls a shaft sufficiently long to extend through the engine block to the hydraulic system wherein bushing support mandrels may be selectively located and secured along the shaft to install or remove a bushing dependent on the location of the corresponding bushing journal.

Another object of the present invention is to provide a method of installing or removing bushings from a plurality of axially aligned bushing journals in an internal combustion engine including a tool powered by a simple, hydraulic system employing a hydraulic piston which is always pressurized on the same side whether the system is operating in the pushing or the pulling mode.

The above identified objects are accomplished by a simple, hydraulically powered tool which includes a shaft of sufficient length to extend from one end of the engine through each of a series of axially spaced bearing journals to an hydraulic system. Particularly, the hydraulic system includes an outer cylinder in which a reciprocating piston, selectively connected to the shaft, is pushed or pulled by hydraulic fluid pressure dependent on the direction in which the hydraulic system is mounted. The shaft, which can extend through a central passage of the piston and outer cylinder, is pushed by the piston when a piston connecting collar is placed on the shaft in one of a plurality of axially spaced annular grooves located along the length of the shaft. Specifically, the piston collar interconnects the piston with the shaft and thus forces the shaft in the direction of piston movement. A mandrel mounted on the shaft is preferably used to engage a bushing to impart a force to the bushing for either installation or removal. A bushing collar similar to the piston engaging collar, may be used as a means of engaging the mandrel with the shaft. A user can easily use the tool by engaging a pushing or pulling mounting to the engine block and placing the hydraulic unit into the mounting so that the direction the piston will travel corresponds to the desired mode of operation. A single combination of main components are used to install or remove camshaft bushings from bearing journals in either a pushing or pulling mode of operation depending upon which is more appropriate for the particular journal.

Other and more specific objects of the present invention may be made clearer from the following Brief Description of the Drawings and Detailed Description of the Preferred Embodiment.

DETAILED DESCRIPTION OF THE PREFERRED EMBODIMENT

Figure 1:
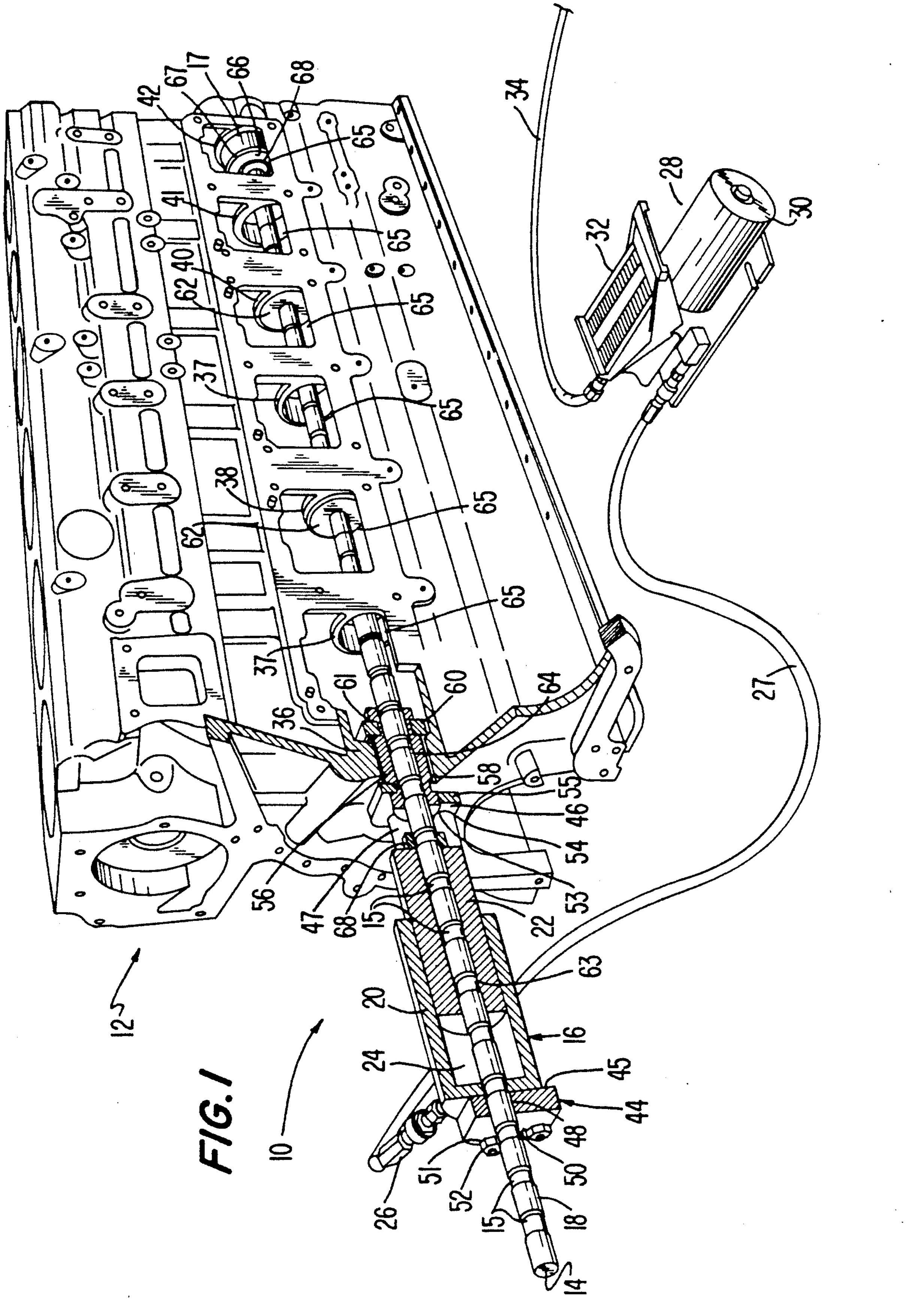
FIG. 1 is a partially out-away front perspective view of a hydraulic cam bushing installation and removal tool designed in accordance with this invention illustrating the tool in a pushing mode.

For a clear understanding of the subject invention, reference is initially made to FIG. 1 in which a bushing service tool 10 for installing or removing camshaft bushings from an internal combustion engine 12 designed in accordance with the subject invention is illustrated. In particular, the tool includes a shaft 14 which extends longitudinally through the entire length of the engine block to a hydraulic unit 16. Force is applied to the shaft by hydraulic unit 16 to allow installation and removal of camshaft bushings. The simplified bushing service tool 10, designed in accordance with this invention, allows a user to service each of a series of camshaft bushings without requiring excessive manual force or compromising surrounding engine components while removing or installing bushings in hard to reach engine journals. The unique elements of bushing service tool 10 will be better understood after an explanation of the components and special features provided by its use in an internal combustion engine.

A typical engine includes a series of axially aligned journals which house camshaft bearings to provide support to a camshaft. Bushing service tool 10 of the present invention provides a means to remove and replace each of these journals to allow simple servicing of a camshaft bushing, such as bushing 17. Shaft 14 is preferably provided to extend through the entire combined length of engine 12 and hydraulic unit 16. Shaft 14 further includes several axially spaced annular grooves 15 forming force transferring shoulders located in axial alignment along the entire length of the shaft 14. These annular grooves provide means for securing other components of tool 10 as will be discussed below. Providing several force transferring shoulders along the entire length of the shaft allows removal and/or replacement of any one of the bushings without requiring undue movement of the shaft.

Referring now specifically to FIG. 1, the simplicity and convenience of tool 10 made in accordance with the present invention can be readily understood. Hydraulic unit 16 includes an outer cylinder 20 within which is mounted a reciprocating piston 22. Preferably, shaft 14 is designed to pass entirely through unit 16 further simplifying assembly and use of tool 10. The unit is specially sealed and sized such that hydraulic fluid which enters and fills space 24 does not escape during operation. Specifically, unit 16 is an OTC RH Center Hole Ram commercially available from Owatonna Tool Corporation of Owatonna, Minnesota. Unit 16, preferably, has a 10 ton capacity with $3\frac{1}{4}''$ of stroke capability. However, a comparable unit having different specifications may also be used. Appropriate hydraulic fluid is supplied to unit 16 through valve connection 26 from supply hose 27. The fluid is forced through hose 27 by hydraulic pump unit 28. Pump unit 28 includes a foot operated pump 30 and foot pedal 32. In particular, hydraulic pump 28 is an ENERPAC PA135 Air Hydraulic Pump. Hydraulic fluid is supplied directly from its source through supply hose 34. Therefore, once tool 10 is set up for installation or removal, a user simply depresses and releases foot pedal 32 a sufficient number of times to force enough fluid into cylinder 20 to advance piston 22 as required to remove or install a bushing. To collapse the hydraulic unit, a drain valve, not illustrated, is opened to permit piston 22 to be mechanically returned to its retracted position thereby causing the hydraulic fluid to return to the source through hose 34.

Hydraulic unit 16 is mounted on the engine at a point adjacent camshaft #1 journal (36). The #2 through #7 journals 37 to 42, respectively, are also shown in FIG. 1. Due to the convenient structure of hydraulic unit 16, both a pulling and a pushing mode of operation is available. Differing mounting structures allow unit 16 to be placed in the proper direction to provide these operating modes. FIG. 1 illustrates tool 10 in the pushing mode of operation which is primarily intended for installation of a bushing in the #7 journal.

In the pushing mode, hydraulic unit 16 is supported by mounting cradle 44 which is engageable to engine 12 at the #1 journal 36. More particularly, mounting cradle 44 includes a first plate 45 positioned remotely from the engine, a second plate 46 positioned adjacent the engine block and extension rods 47 interconnecting plates 45 and 46 in spaced relationship to receive cylinder 20 therebetween. First plate 45 is provided with an opening 48 which is circular in shape to allow shaft 14 to pass therethrough. Also included are four bores 50 (only two of which are illustrated) having a sufficient diameter to allow the first threaded ends 51 of extension rods 47 to pass through and threadedly engage attachment nuts 52. First plate 45 and associated attachment nuts 52 provide a secured, stop for engaging the outer end of outer cylinder 20 during the pushing mode of tool 10 operation.

Second plate 46 includes four threaded bores 53 to engage second threads 54 of extension rods 47. The threaded bores of plate 46 and the bores of first plate 45 are aligned allowing extension rods 47 to be parallel to each other. Further, second plate 46 is provided with a U-shaped slot 55 which allows a slidable connection to an engagement mandrel 56. Engagement mandrel 56 is inserted into the #1 journal 36 and U-shaped slot 55 allows plate 46 to slide over mandrel 56 in first groove 58. Mandrel 56 is secured to the #1 journal 36 by a U-shaped collar 60 which is also slidable over engagement mandrel 56 in a second groove 61. Both grooves 58 and 61 extend around the entire circumference of engagement mandrel 56 to simplify installation by permitting sliding engagement without regard to the rotational orientation of mandrel 56.

Before shaft 14 is slid through hydraulic unit 16 and into engine 12, cylindrical guides 62 may be placed in intermediate journals for stabilizing shaft 14 to prevent bending or improper alignment of a bushing. C Preferably, guides 62 are placed in the #3 journal 38 and the #5 journal 40 as shown in FIG. 1, but any journal intermediate the #1 journal 36 and the journal requiring service is appropriate. Also, more than two guides may be needed in some circumstances.

Shaft 14 is inserted through plate 45 axial passage 63 of hydraulic unit 16, plate 46 and axial passage 64 of engagement mandrel 56 to enter the engine journals. FIG. 1 illustrates an installation of bushing 17 into the #7 journal 42 by a pushing force. As seen through hand hole 65 in the side of the engine, a bushing support mandrel 66, to be described more fully hereinafter, is attached to shaft 14. A collar 68 is connected to shaft 14 by being slid into the first available annular groove to engage a force transferring shoulder 18 to provide mandrel 66 with a secured support location. Bushing 17 is then placed around the shaft and slid over mandrel 66 until it reaches shoulder 67 which retains bushing 17 thereon. To connect shaft 14 to the hydraulic unit 16, a collar 68 is connected to shaft 14 also located adjacent piston 22 of hydraulic unit 16 in the first available annular groove to engage a force transferring shoulder 18 such that when hydraulic fluid forces piston 22 forward, away from the outer end of cylinder 20, shaft 14 also moves forward to provide a pushing force to bushing 17 through bushing support mandrel 66.

Figure 2:
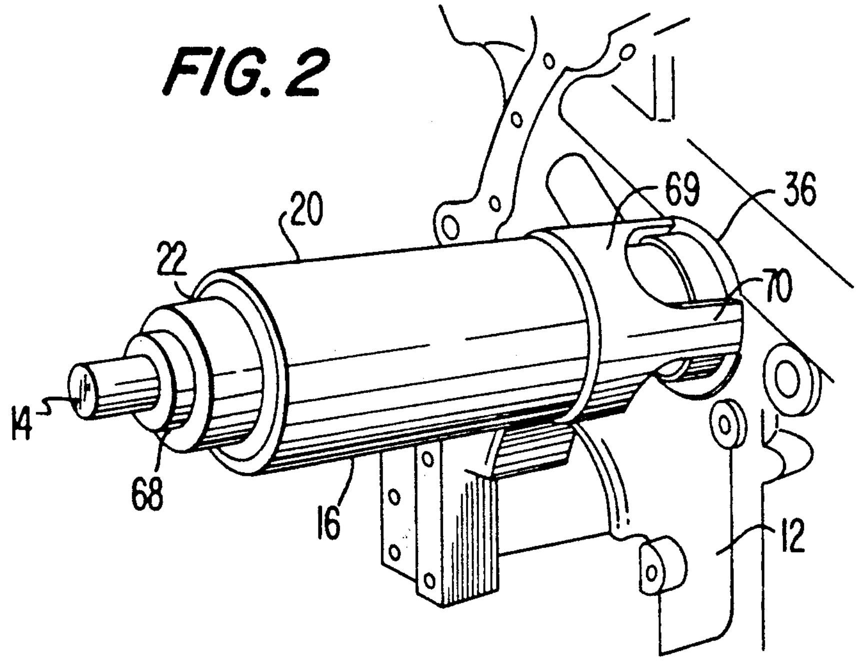
FIG. 2 is an enlarged, perspective view of the hydraulic system mounted on the engine in a pulling mode configuration.

Referring now to FIG. 2, cylinder spacer 69 illustrates the second and more often used pulling mode of operation for tool 10. In this case, spacer 69 is located between engine 12 and hydraulic unit 16. Legs 70 of spacer 69 go against block 12. This allows the #1 cam bushing to be pulled into the open inside diameter of spacer 69. The shaft 14 will support the cylinder 20 when it pulls against the base 71 of spacer 69. Again shaft 14 extends through piston 22, and collar 68 is located in the first available annular groove 15 to engage a force transferring shoulder 18 to allow piston 22 to advance shaft 14.

Figure 3:
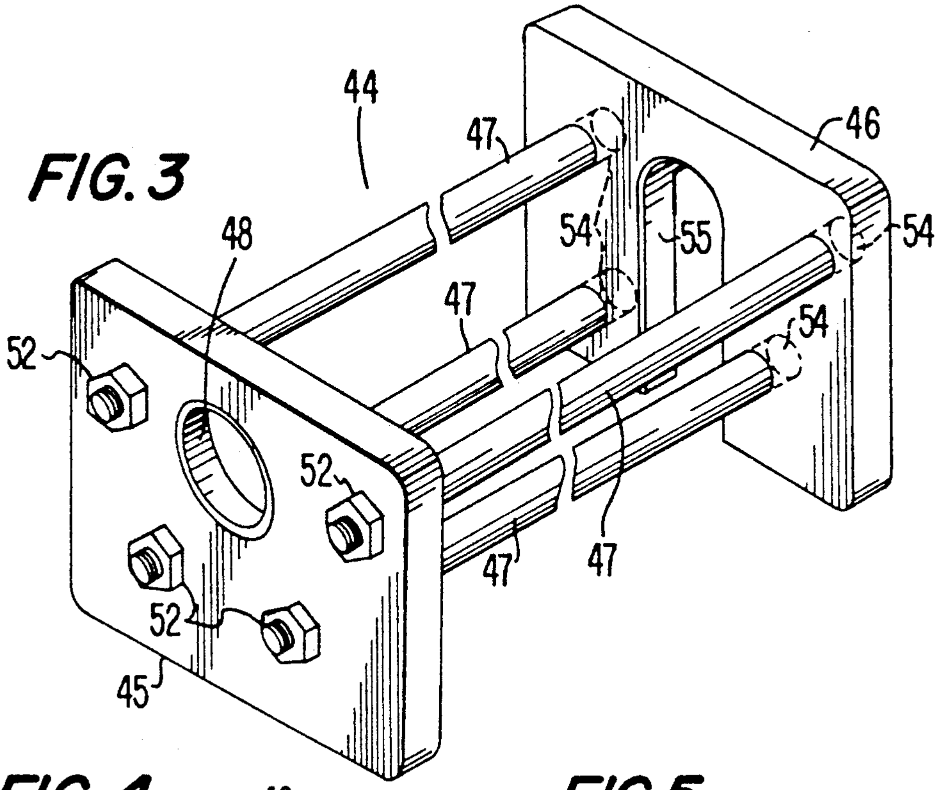
FIG. 3 is an enlarged close perspective view of the mounting cradle illustrated in FIG. 1.
Figure 4:
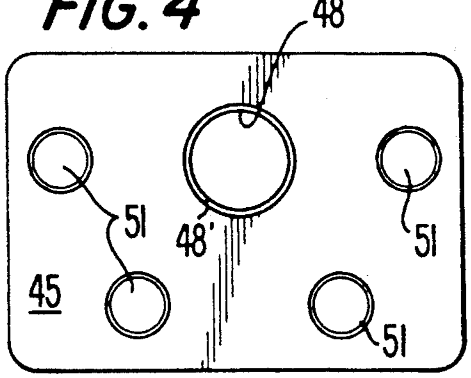
FIG. 4 is an elevational view of the first plate of the mounting cradle.
Figure 5:
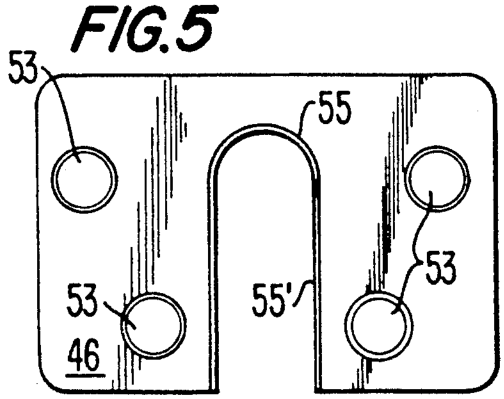
FIG. 5 is an elevational view of the second plate of the mounting cradle.

FIGS. 3–5 provide detailed views of the mounting cradle 44. First plate 45 is clearly shown in FIG. 3 connected with the threaded ends of extension rods 47 which extend through bores 51 to engage attachment nuts 52. Second plate 46 is also shown more clearly, illustrating opening 48 and the positions of bores 53 adapted to threadedly engage the threaded ends 54 of rods 47. The location of U-shaped slot 55 is also more clearly illustrated by this view.

FIGS. 4–5 provide an even closer view of first plate 45 and second plate 46. Note that opening 48 and slot area 55, respectively, can be machined to include a bevel 48' and 55', respectively, to increase component insertability.

Figure 6:
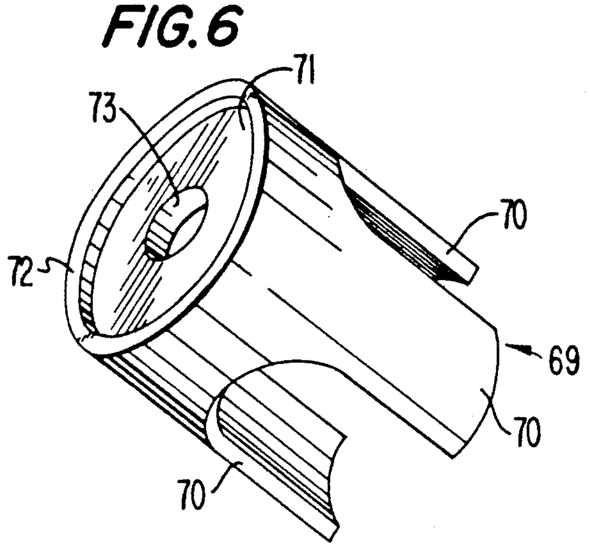
FIG. 6 is a perspective view of the mounting spacer illustrated in FIG. 2.

Spacer 69 is further shown in FIG. 6 including legs 70 for engaging the engine and including base 71 and flange 72 for engaging cylinder 20. Outer cylinder 20 is made in accordance with the present invention to fit within flange 72 and rest against base 71. Shaft 14 fits through opening 73 to allow shaft movement.

Figure 7:
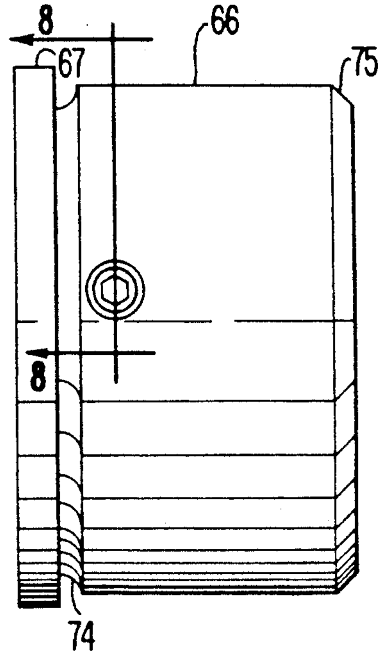
FIG. 7 is a side elevational view of the bushing support mandrel.
Figure 8:
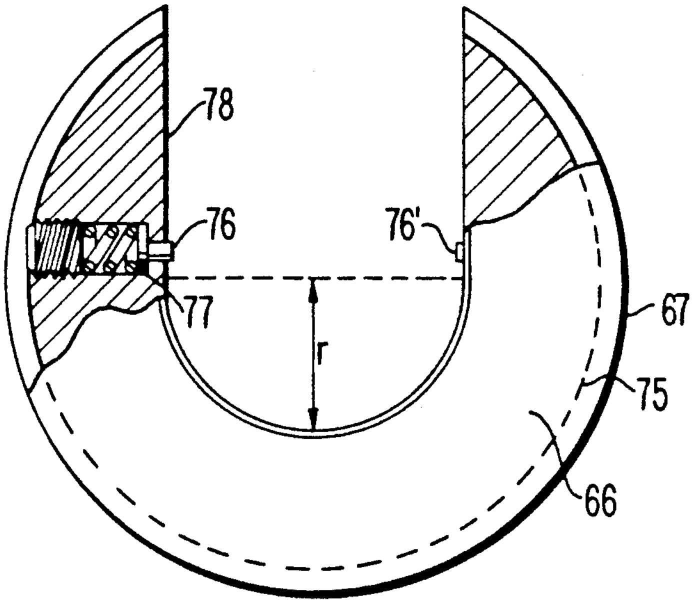
FIG. 8 is a partial cross sectional view of the bushing support mandrel taken along lines 8—8 of FIG. 7.

To provide bushing removal and installation, the present invention includes a bushing support mandrel 66. As illustrated in FIGS. 7–8, bushing support mandrel 66 is predominately cylindrical in shape but has a U-shaped slot 78 to allow mandrel 66 to be slipped over shaft 14. At one end of mandrel 66, a shoulder 67 is provided to engage the end surface of a bushing as will be explained hereafter. An undercut 74 separates shoulder 67 from the main body of the mandrel to reduce concentrated stress. A bevel 75 is also provided at the opposite end of mandrel 66 to facilitate insertion of the mandrel through a bushing. To better secure mandrel 66 to shaft 14, a detent 76 is provided which is biased by a spring 77. A similar spring biased detent 76' may be provided on the other side of U-shaped slot 78. Moreover, the width of U-shaped slot 78 is slightly greater than the diameter of shaft 14 to allow mandrel 66 to slip easily over the shaft. The position of detents 76 along the walls of U-shaped slot 78 will determine the degree of stability the mandrel has while attached to the shaft. Preferably the detents should be spaced from the inside end of slot 78 by a distance r which is slightly greater than the radius of shaft 14.

Figure 10:
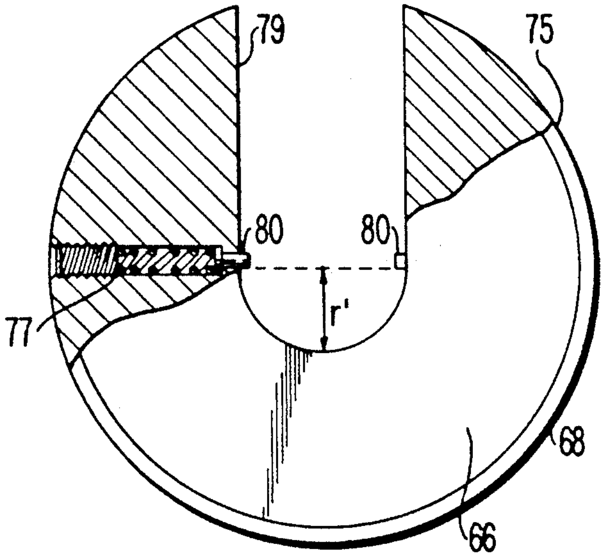
FIG. 10 is a partial cross sectional view of the collar taken along lines 10—10 of FIG. 9.
Figure 9:
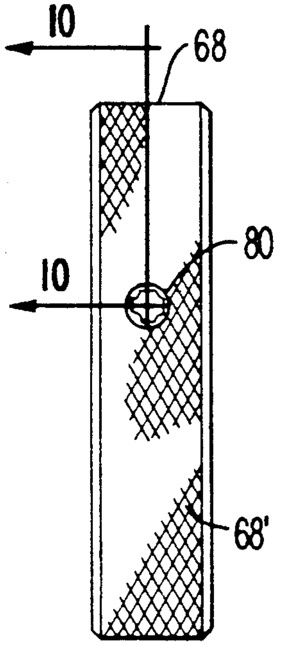
FIG. 9 is a side elevational view of the collar.

Referring now to FIGS. 9–10, collar 68 is illustrated to include a knurled outer surface 68' to increase the grippability of the collar for better user handling. As in the case of bushing support mandrel 66, collar 68 is designed with a similar U-shaped slot 79 and spring-biased detents 80. Also, the walls of the U-shaped slot are separated by a distance which is slightly greater than the diameter of the bottom of each annular groove 15 in shaft 14 so it can be easily slid over the shaft between the two force transferring shoulders 18 formed by each of the annular grooves along the shaft. As stated above, collar 68 retains the position of bushing support mandrel 66. An identical collar 68 (FIG. 1) transfers the movement of piston 22 of hydraulic unit 16 to shaft 14 during pushing and pulling modes of operation. Also, a larger collar 60, having the same general design, is used to r support engagement mandrel 56 in the #1 journal 36 during the pushing mode.

Figure 11:
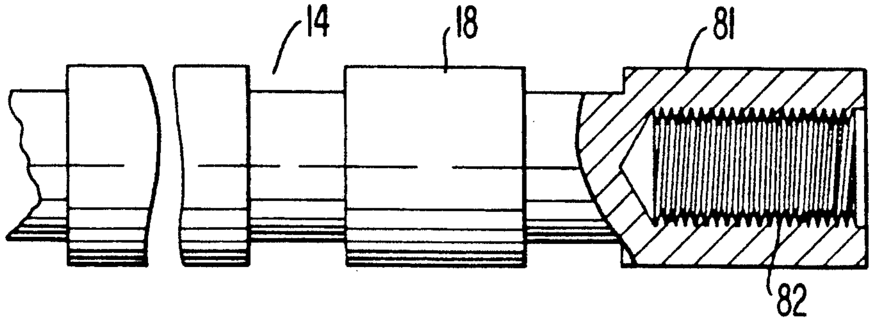
FIG. 11 is a fragmentary, partial cross sectional view of the shaft used in the tool designed in accordance with the subject invention including an attachment mechanism.

FIG. 11 shows an example of an attachment mechanism 81 which can be a part of shaft 14 to allow differing devices to be attached to shaft 14. The embodiment illustrated in FIG. 11 demonstrates a socket type design which includes an internally threaded portion 82.

Bushing service tool 10 is easily operated by a user utilizing the components described in detail above. To begin, the user must decide, as a result of the particular journal to be serviced, whether to operate in the pushing or pulling mode. The #1-#6 journals 36 to 41, respectively, are generally serviced using the pulling mode. Generally, only the #7 journal 42 installation requires the pushing mode because that journal is blind due to a cap placed at the corresponding end of the engine. However, the remaining journals may be serviced using the pushing mode if convenience dictates.

Figure 12:
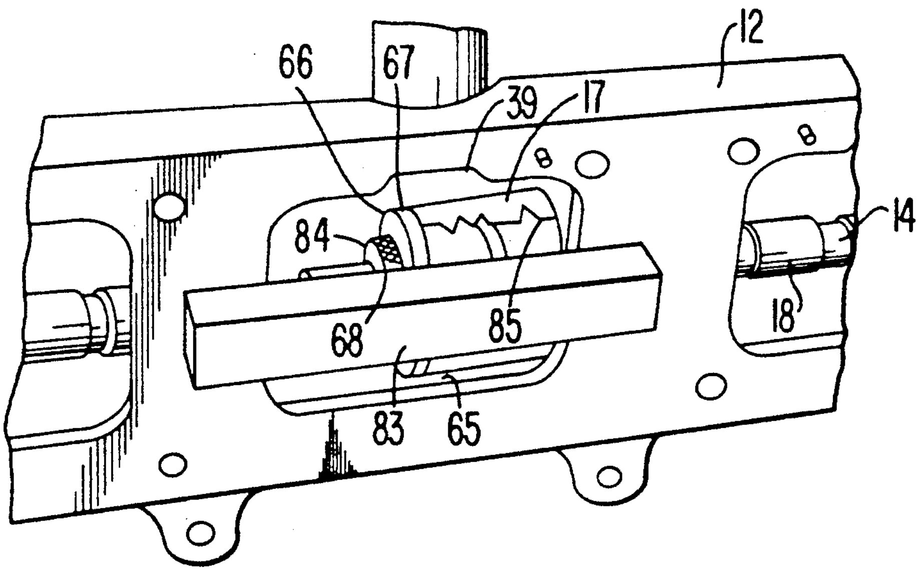
FIG. 12 is an enlarged close perspective view of the pointer indicator aligning a bushing in an intermediate engine camshaft journal.

To operate bushing service tool 10 in the pulling mode to remove or install bushing 17 from an intermediate journal such as the #4 journal 39, cylinder spacer 69 is placed on the engine at the #1 journal 36. Guides 62 are preferably placed in the #2 and #6 journals 37 and 41, respectively. Then hydraulic unit 16 is placed within flange 72 against base 71 of spacer 69 and shaft 14 is slid through the assembly into the engine to a sufficient length to enter guide 65 in the #6 journal 41. Bushing support mandrel 66 is placed over shaft 14 conveniently close to the #4 journal through hand hole 65 as shown in FIG. 12. Collars 68 are placed in grooves 15 adjacent both the piston 22 of hydraulic unit 16 and on the opposite side of the #1 journal 36 adjacent support mandrel 66. If formed in two semi-circular halves, bushing 17 is then placed over shaft 14 such that it may be slid onto support mandrel 66 until it becomes flush with shoulder 67 thereon. FIG. 12 illustrates a pointer indicator 83 which can be simply placed on the machined face of engine 12 over hand hole 65. Pointer indicator includes a pointer 84 which is used to align with butt-joint seam 85 between the halves of the bushing. This places the bushing in proper alignment so that lubricating fluid from the engine will pass through an opening adjacent seam 85 to a camshaft bearing during normal engine operation.

Figure 13:
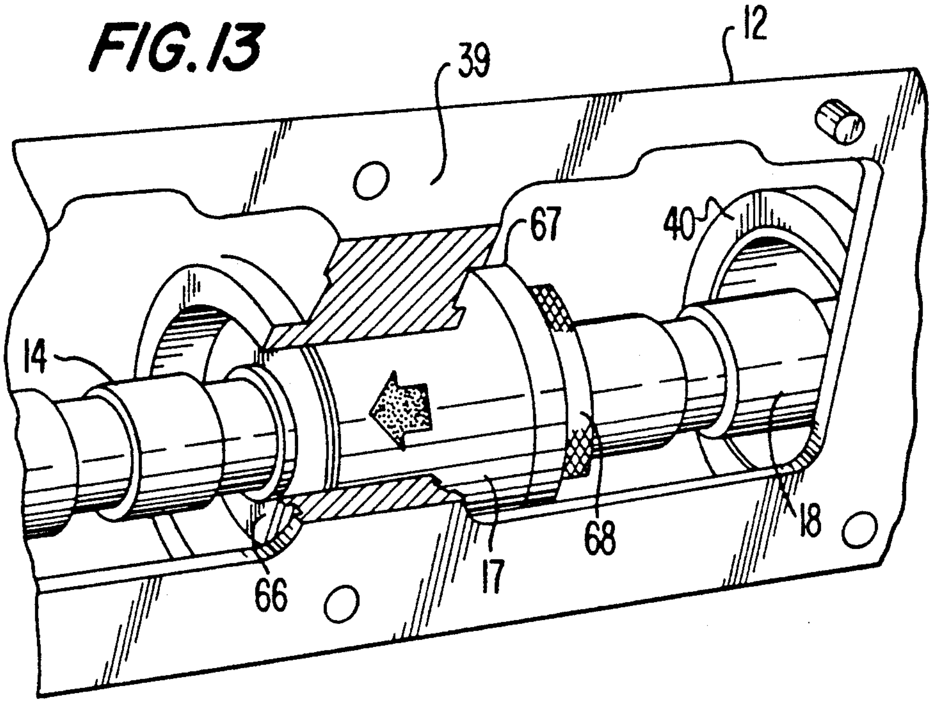
FIG. 13 is an enlarged, partially broken away perspective view of an intermediate engine camshaft journal wherein a bushing is being pulled into position.
Figure 14:
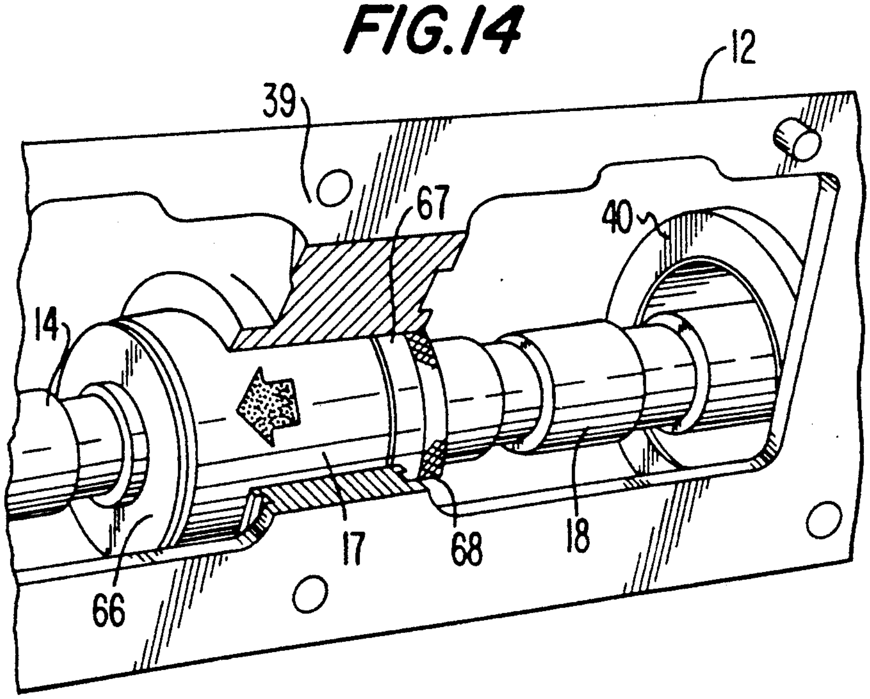
FIG. 14 is an enlarged, partially broken away perspective view of an intermediate engine camshaft journal wherein a bushing is being pulled out of position.

Once the bushing has been placed in proper alignment, the user can depress foot pedal 32 to provide hydraulic force to piston 22 and force shaft 14 out of the engine 12 and simultaneously install bushing 17 into the journal, as illustrated by FIG. 13. To remove a worn bushing from an intermediate journal using the pulling mode of operation, the same procedure explained above is used, excluding the use of pointer indicator 83 or the step of manually placing bushing 17 on support mandrel 66. FIG. 14 shows worn bushing 17 being pulled from the #4 journal 39.

Figure 15:
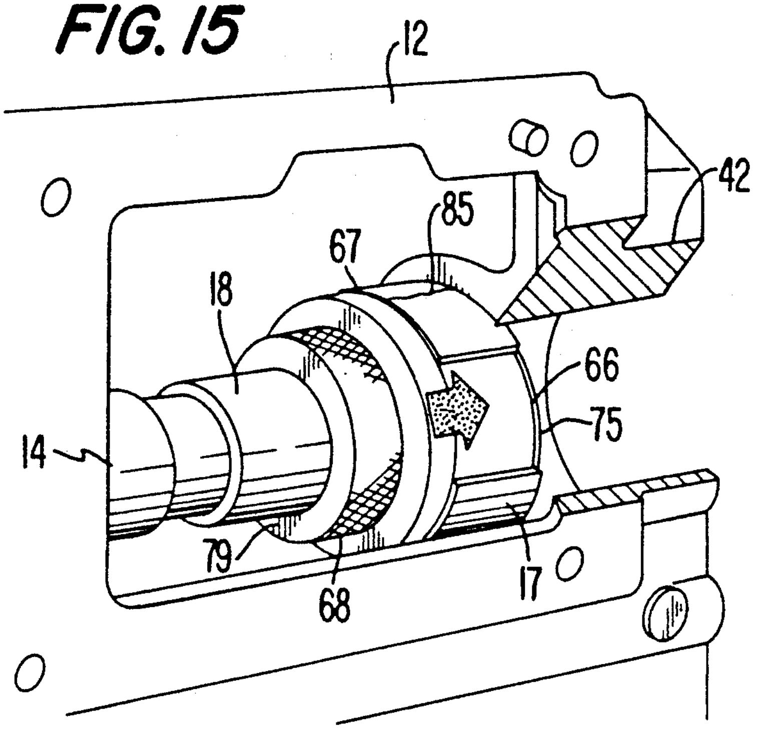
FIG. 15 is an enlarged, partially broken away perspective view of the #7 engine camshaft bushing puller installing the #7 bushing.

As stated above, bushing installation of the #7 journal 42 requires the pushing mode. For this purpose, hydraulic unit 16 is merely reversed in direction and placed in mounting cradle 44. Initially, mounting cradle 44 is assembled in accordance with the embodiment shown in FIGS. 1 and 3. Engagement mandrel 56 is inserted into the #1 journal 36 and a U-shaped collar 60 of sufficient size to slide into second groove 61 secures engagement mandrel 56 in the #1 journal 36. U-shaped cut-out 55 of second plate 46 of cradle 44 is slid into first groove 58 of engagement mandrel 56. Hydraulic unit 16 is then laid within cradle 44 such that piston 22 faces the engine. Thereafter, the procedure outlined above is the same for installing the bushing in an intermediate journal, however, in this mode, bushing 17 is pushed into the engine journal as illustrated in FIG. 15.

Figure 16:
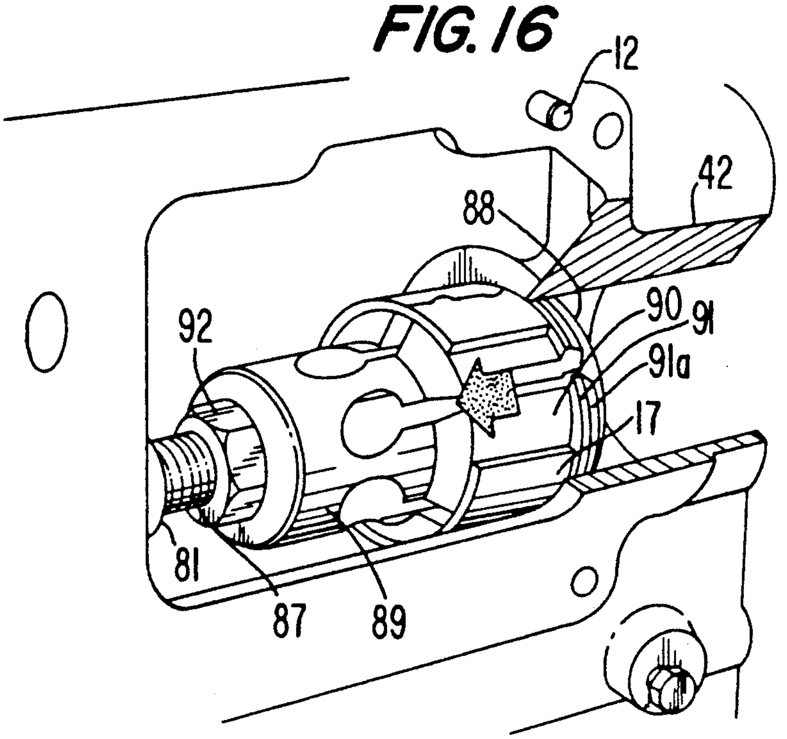
FIG. 16 is an enlarged, partially broken away perspective view of the #7 engine camshaft bushing puller removing the #7 bushing.

Finally, to remove a bushing from the #7 journal #7 42, a special bushing puller 86, illustrated in FIG. 16, is connected to attachment mechanism 81 of shaft 14. Bushing puller 86 includes a threaded neck 87 with an expandable mandrel 88 at the opposite end thereof. A collet 89 is made to slide slightly upon neck 87. Collet 89 includes flexible legs 90 with outwardly directed lips 91. Lips 91 have an inclined surface 91*a* at their leading ends which first contact the bushing so that expander disk 89 moves slightly forward to allow flexible legs 90 to be compressed radially inwardly to allow collet 89 to enter bushing 17. A nut 92 on threaded neck 87 stops the movement of collet 89 during entry into the bushing. Once lips 91 have cleared the end of the bushing, nut 92 may be advanced to lock legs 90 in place. Specifically, expander disk 88 has a beveled outer perimeter such that its diameter varies from $1\frac{7}{8}''$ nearest the collet to 2" at the opposite end to cause legs 90 to be urged outwardly as nut 92 is tightened. After legs 90 are locked in place, hydraulic unit may be pressurized to remove the bushing from the #7 journal.

Industrial Applicability

This invention has particular utility for servicing of internal combustion engines particularly relating to installing and removing camshaft bushings. The disclosed tool provides an easy to use, hydraulically powered service tool which can be used in the field to remove or install bushings. It is understood that various additional changes and modifications in the form and detail of the present invention illustrated in detail may be made without departing from the scope and spirit of the present invention as Well as the invention's use in a variety of applications.

I claim:

1. A tool for installing and removing a bushing at each of a plurality of axially aligned bushing journals in an internal combustion engine comprising:

(a) a shaft of sufficient length to extend from one end of the engine through each of the journals to the furthest removed journal, said shaft having a plurality of force transferring means at axially spaced locations along said shaft for permitting bushing installing or removing forces to be transferred to and from said shaft;

(b) a bushing support means adapted to be mounted on said shaft for engaging a bushing and imparting thereto a force for installing or removing the bushing from a journal of the engine; and (c) an hydraulic means engageable with one end of the engine and said shaft to allow operation in one of a pushing and pulling mode for providing operative force in only a single direction and including a cylinder assembly which provides a pulling force to said shaft when placed in one direction and a pushing force to said shaft when said cylinder assembly is reversed and placed in an opposite direction.

2. A tool for installing and removing a bushing as set forth in claim 1 wherein said hydraulic means further includes a reciprocating piston located within said cylinder assembly which provides application of one of a pulling and pushing force to said shaft.

3. A tool for installing and removing a bushing as set forth in claim 1 wherein said hydraulic means includes an axial passage allowing said shaft to extend entirely therethrough.

4. A tool for installing and removing a bushing as set forth in claim 2 wherein said force transferring means includes a plurality of annular grooves formed at spaced locations along said shaft, each said groove forming a pair of spaced shoulders.

5. A tool for installing and removing a bushing as set forth in claim 1 wherein said bushing support means comprises a mandrel having a cylindrical portion with a diameter corresponding to the diameter of the inside bearing surface of said bushing allowing said bushing to be mounted on said cylindrical portion.

6. A tool for installing and removing a bushing as set forth in claim 7 wherein said mandrel further includes a radial shoulder for engaging one end face of a bushing placed on said cylindrical portion.

7. A tool for installing and removing a bushing as set forth in claim 1 further including a shaft guide means insertable into the engine journals to receive and support the shaft at journal locations intermediate the journal at which a bushing is being inserted or removed.

8. A tool for installing and removing a bushing as set forth in claim 7 wherein said shaft guide means includes a cylindrical body formed of plastic and containing a central passage for receiving the shaft.

9. A tool for installing and removing a bushing at each of a plurality of axially aligned bushing journals in an internal combustion engine comprising:

(a) a shaft of sufficient length to extend from one end of the engine through each of the journals to the furthest removed journal, said shaft having a plurality of force transferring means as axially spaced locations along the shaft for permitting bushing installing or removing forces to be transferred to or from said shaft;

(b) a bushing support means adapted to be mounted on said shaft for engaging a bushing and imparting thereto a force for installing or removing the bushing from a journal of the engine;

(c) an hydraulic means engageable with one end of the engine and said shaft for imparting either a pushing force or a pulling force to said shaft;

(d) a first mounting means for mounting said hydraulic means on said engine when said hydraulic means is imparting a pulling force to said shaft; and (e) a second mounting means, distinct from said first mounting means, for mounting said hydraulic means on said engine when said hydraulic means is imparting a pushing force to said shaft.

10. A tool for installing and removing a bushing as set forth in claim 9 wherein said shaft further includes a connection means located at one end thereof to allow fittings having correspondingly adaptable portions to be attached to said shaft.

11. A tool for installing and removing a bushing as set forth in claim 9 wherein said second mounting means comprises a spacer unit including legs to engage the engine and a base supported by said legs to provide a force receiving location for said hydraulic means during the pulling mode.

12. A tool for installing and removing a bushing at each of a plurality of axially aligned bushing journals in an internal combustion engine comprising:

(a) a shaft of sufficient length to extend from one end of the engine through each of the journals to the furthest removed journal, said shaft having a plurality of force transferring means at axially spaced locations along the shaft for permitting bushing installing and removing forces to be transferred to or from said shaft;

(b) a bushing support means adapted to be mounted on said shaft for engaging a bushing and imparting thereto a force for installing or removing the bushing from a journal of the engine; and (c) an hydraulic means engageable with one end of the engine and said shaft to allow operation in one of a pushing mode and pulling mode, wherein said hydraulic means includes an axial passage allowing said shaft to extend entirely therethrough.

13. A tool for installing and removing a bushing at each of a plurality of axially aligned bushing journals in an internal combustion engine comprising:

(a) a shaft of sufficient length to extend from one end of the engine through each of the journals to the journal furthest removed from said one end, said shaft having a plurality of force transferring means at axially spaced locations along said shaft for permitting bushing installing or removing forces to be transferred to and from said shaft:

(b) a bushing support mean adapted to be mounted on said shaft for engaging a bushing and imparting thereto a force for installing or removing the bushing from a journal of the engine;

(c) an hydraulic means engageable with said one end of the engine and said shaft to allow operation in one of a pushing and pulling mode for providing operative force in only a single direction and including a cylinder assembly which provides a pulling force to said shaft when placed in one direction and a pushing force to said shaft when said cylinder assembly is reversed and placed in an opposite direction; and (d) an engaging means for engaging said piston and said bushing support means with said shaft, said engaging means including first and second collars.

14. A tool for installing and removing a bushing at each of a plurality of axially aligned bushing journals in an internal combustion engine comprising:

(a) a shaft of sufficient length to extend from one end of the engine through each of the journals to the journal furthest removed from said one end, said shaft having a plurality of force transferring means at axially spaced locations along the shaft for permitting bushing installing or removing forces to be transferred to or from said shaft;

(b) a bushing support means adapted to be mounted on said shaft for engaging a bushing and imparting thereto a force for installing or removing the bushing from a journal of the engine;

(c) an hydraulic means engageable with said one end of the engine and said shaft for imparting either a pushing force or a pulling force to said shaft;

(d) a first mounting means for mounting said hydraulic means on said engine when said hydraulic means is imparting a pulling force to said shaft;

(e) a second mounting means, distinct from said first mounting means, for mounting said hydraulic means on said engine when said hydraulic means is imparting a pushing force to said shaft; and (f) an engaging means for engaging said piston and said bushing support means with said shaft, said engaging means including first and second collars.

15. A tool for installing and removing a bushing at each of a plurality of axially aligned bushing journals in an internal combustion engine comprising:

(a) a shaft of sufficient length to extend from one end of the engine through each of the journals to the journal furthest removed from said one end, said shaft having a plurality of force transferring means at axially spaced locations along said shaft for permitting bushing installing or removing forces to be transferred to and from said shaft wherein said force transferring means includes a plurality of annular grooves formed at spaced locations along said shaft, each said groove forming a pair of spaced shoulders;

(b) a bushing support means adapted to be mounted on said shaft for engaging a bushing and imparting thereto a force for installing or removing the bushing from a journal of the engine;

(c) an hydraulic means engageable with said one end of the engine and said shaft to allow operation in one of a pushing and pulling mode for providing operative force in only a single direction and including a cylinder assembly which provides a pulling force to said shaft when placed in one direction and a pushing force to said shaft when said cylinder assembly is reversed and placed in an opposite direction wherein said hydraulic means further includes a reciprocating piston located within said cylinder assembly which provides application of one of a pulling and pushing force to said shaft; and (d) an engaging means for engaging said piston and said bushing support means with said shaft, said engaging means including first and second collars, each said collar containing a slot having a width slightly greater than the diameter of the base of said annular grooves to allow said first and second collars to be received in corresponding annular grooves adjacent said piston and said bushing support means.

16. A tool for installing and removing a bushing as set forth in claim 15 wherein each said collar includes at least one radially extending, spring-biased detent located on one side of said slot to further secure said collar to said slot.

17. A tool for installing and removing a bushing at each of a plurality of axially aligned bushing journals in an internal combustion engine comprising:

(a) a shaft of sufficient length to extend from one end of the engine through each of the journals to the journal further removed from said one end, said shaft having a plurality of force transferring means at axially spaced locations along said shaft for permitting bushing installing or removing forces to be transferred to and from said shaft;

(b) a bushing support means adapted to be mounted on said shaft for engaging a bushing and imparting thereto a force for installing or removing the bushing from a journal of the engine wherein said bushing support means comprises a mandrel having a cylindrical portion with a diameter corresponding to the diameter of the inside bearing surface of said bushing allowing said bushing to be mounted on said cylindrical portion and an axial extending slot which allows said mandrel to slip over said shaft, said mandrel including a t lest one radially extending, spring-biased detent located on one side of said slot to further secure said mandrel to said shaft; and (c) an hydraulic means engageable with said one end of the engine and said shaft to allow operation in one of a pushing and pulling mode for providing operative force in only a single direction and including a cylinder assembly which provides a pulling force to said shaft when placed in one direction and a pushing force to said shaft when said cylinder assembly is reversed and placed in an opposite direction.

18. A tool for installing and removing a bushing as set forth in claim 17 wherein the sides of said slot is separated by a distance which is slightly greater than the diameter of said shaft to allow said mandrel to slide easily over said shaft.

19. A tool for installing and removing a busing at each of a plurality of axially aligned bushing journals in an internal combustion engine comprising:

(a) a shaft of sufficient length to extend from one end of the engine through each of the journals to the journal furthest removed from said one end, said shaft having a plurality of force transferring means at axially spaced locations along the shaft for permitting bushing installing or removing forces to be transferred to or from said shaft;

(b) a bushing support means adapted to be mounted on said shaft for engaging a bushing and imparting thereto a force for installing or removing the bushing from a journal of the engine;

(c) an hydraulic means engageable with said one end of the engine and said shaft for imparting either a pushing force or a pulling force to said shaft;

(d) a first mounting means for mounting said hydraulic means on said engine when said hydraulic means is imparting a pulling force to said shaft; and (e) a second mounting means, distinct from said first mounting means, for mounting said hydraulic means on said engine when said hydraulic means is imparting a pushing force to said shaft wherein said first mounting means includes a support cradle including a first plate, a second plate, and a plurality of extension rods wherein said first plate includes a hole through which said shaft may extend and a first series of bores to receive said extension rods, said second plate includes a U-shaped slot portion extending down having a width greater than said shaft to receive the same and a second series of internally threaded bores in line with said first series of bores, said plurality of extension rods are threaded atone end to mate with the second series of internally threaded bores and threaded at the opposite end to mate with nuts located outside of the first plate.

20. A tool for installing and removing a bushing as set forth in claim 19 further including an engagement mandrel which is predominately cylindrical in shape comprising a central passage having a slightly greater diameter than the diameter of said shaft and two radially extending grooves located near each end of said engagement mandrel wherein said first notch is shaped to receive said U shaped slot portion of the second plate of said support cradle and said second notch receives a collar to maintain said engagement mandrel in the first journal of the engine.

21. A tool for installing and removing a bushing at each of a plurality of axially aligned bushing journals in an internal combustion engine comprising:

(a) a shaft of sufficient length to extend from one end of the engine through each of the journals to the journal furthest removed forces to be transferred top or from said shaft and a connection means located at one end thereof having an internally threaded socket portion to allow fittings having correspondingly adaptable portions to be attached to said shaft;

(b) a bushing support means adapted to be mounted on said shaft for engaging a bushing and imparting thereto a force for installing or removing the bushing from a journal of the engine;

(c) an hydraulic means engageable with said one end of the engine and said shaft for imparting either a pushing force or a pulling force to said shaft;

(d) a first mounting means for mounting said hydraulic means on said engine when said hydraulic means is imparting a pulling force to said shaft; and (e) a second mounting means, distinct from said first mounting means, for mounting said hydraulic means on said engine when said hydraulic means is imparting a pushing force to said shaft.

22. A tool for installing and removing a bushing at each of a plurality of axially aligned bushing journals in an internal combustion engine comprising:

(a) a shaft of sufficient length to extend from one end of the engine through each of the journals to the journal furthest removed from said one end, said shaft having a plurality of force transferring means at axially spaced locations along the shaft for permitting bushing installing or removing forces to be transferred to or from said shaft;

(b) a bushing support means adapted to be mounted on said shaft to engaging a bushing and imparting thereto a force for installing or removing the bushing from a journal of the engine;

(c) an hydraulic means engageable with said one end of the engine and said shaft for imparting either a pushing force to said shaft;

(d) a first mounting means for mounting said hydraulic means on said engine when said hydraulic means is imparting a pulling force to said shaft;

(e) a second mounting means, distinct from said first mounting means, for mounting said hydraulic means on said engine when said hydraulic means is imparting a pushing force to said shaft; and (f) a pointer comprising a rectangular bar having an attached rod perpendicular to said rectangular bar to extend into the engine through an engine hand hole to locate an oil passage of a bushing to assist proper bushing alignment.

23. A tool for installing and removing a bushing as set forth in claim 21 further including a bushing puller comprising an expandable mandrel attached to a threaded stud for attachment, in turn, to said socket portion, said expandable mandrel including a collet having flexible legs with outwardly directed lips, said lips having inclined surfaces at their leading ends to cause said legs to deform inwardly as said collet is inserted into a bushing and to engage the end face of the bushing when said lips clear the opposite end of the bushing to allow said flexible legs to snap outwardly, said expandable mandrel includes an axially movable expander disk having a beveled outer perimeter, said expander disk being adapted to move from an extended position axially beyond the ends of said flexible legs to a retracted position inside of the ends of said flexible legs to lock said legs in their radially expanded position.

* * * * *